| (12) | United States Patent | (10) Patent No.: | US 8,674,639 B2 |
|---|---|---|---|
| | Paintz et al. | (45) Date of Patent: | Mar. 18, 2014 |

(54) ACCURACY OF ROTOR POSITION DETECTION RELATING TO THE CONTROL OF BRUSHLESS DC MOTORS

(75) Inventors: Christian Paintz, Erfurt (DE); Thomas Freitag, Erfurt (DE)

(73) Assignee: Melexis Technologies NV, Tessenderio (BE)

( * ) Notice: Subject to any disclaimer, the term of this patent is extended or adjusted under 35 U.S.C. 154(b) by 95 days.

(21) Appl. No.: 13/061,069

(22) PCT Filed: Aug. 26, 2009

(86) PCT No.: PCT/IB2009/006650
§ 371 (c)(1),
(2), (4) Date: Jun. 1, 2011

(87) PCT Pub. No.: WO2010/023538
PCT Pub. Date: Mar. 4, 2010

(65) Prior Publication Data
US 2011/0221371 A1   Sep. 15, 2011

(30) Foreign Application Priority Data
Aug. 28, 2008   (GB) .................................. 0815672.1

(51) Int. Cl.
*H02P 6/16*   (2006.01)

(52) U.S. Cl.
USPC ...... 318/400.35; 318/430; 318/432; 318/280; 318/823; 318/400.33

(58) Field of Classification Search
USPC ............ 318/430, 432, 280, 400.33, 823, 721, 318/400.35, 282
See application file for complete search history.

(56) References Cited

U.S. PATENT DOCUMENTS

| 4,746,844 A | 5/1988 | MacKelvie et al. |
|---|---|---|
| 4,772,839 A | 9/1988 | MacMinn et al. |

(Continued)

FOREIGN PATENT DOCUMENTS

| EP | 0892489 A1 | 1/1999 |
|---|---|---|
| EP | 1478086 A2 | 11/2004 |

OTHER PUBLICATIONS

International Search Report issued Feb. 23, 2007 for PCT/IB/2006/002430 with an International Filing Date of Sep. 4, 2006 [corresponding to U.S. Appl. No. 12/065,598].

(Continued)

*Primary Examiner* — Eduardo Colon Santana
*Assistant Examiner* — Iftekhar Mustafa
(74) *Attorney, Agent, or Firm* — Gerald T. Gray; Leydig, Voit & Mayer LLP

(57) ABSTRACT

During operation of a 3 phase BLDC motor it is driven by use of a PWM waveform applied to one of the driven phase (curve a). The other driven phase is connected thereto but no driving signal is applied (curve b). The third phase is left floating (curve c). This allows the back EMF in the third phase to be monitored for the purpose of determining rotor position by detection of zero crossing points. The rapid switching of the PWM pulses causes ringing in the back EMF signal indicated for one pulse by the ringed portions 1 of curve c. The ringing in the back EMF signal introduces inaccuracy into position calculations derived from back EMF signal measurement. In order to reduce this ringing, in the present invention, a reverse pulse is applied to the other driving coil shown (curve b) prior to a PWM on pulse. The reverse pulse has a polarity such that it drives the phase current through the linked coils in a direction opposite to that caused by the PWM on pulse. This reverse pulse reduces the magnitude of the ringing in the back EMF signal.

16 Claims, 3 Drawing Sheets

(56) References Cited

U.S. PATENT DOCUMENTS

| | | | |
|---|---|---|---|
| 4,928,043 A | 5/1990 | Plunkett | |
| 4,992,710 A | 2/1991 | Cassat | |
| 5,001,405 A | 3/1991 | Cassat | |
| 5,097,190 A | 3/1992 | Lyons et al. | |
| 5,134,349 A | 7/1992 | Kruse | |
| 5,144,209 A | 9/1992 | Inaji et al. | |
| 5,191,269 A | 3/1993 | Carbolante | |
| 5,191,270 A | 3/1993 | Mccormack | |
| 5,384,527 A | 1/1995 | Rozman et al. | |
| 5,473,240 A | 12/1995 | Moreira | |
| 5,517,095 A | 5/1996 | Carobolante et al. | |
| 5,525,874 A | 6/1996 | Mallarapu et al. | |
| 5,796,235 A | 8/1998 | Schrodl et al. | |
| 5,859,512 A | 1/1999 | Burhker | |
| 5,859,520 A * | 1/1999 | Bourgeois et al. | 318/805 |
| 6,011,368 A | 1/2000 | Kalpathi et al. | |
| RE36,568 E * | 2/2000 | Horst | 318/701 |
| 6,023,141 A | 2/2000 | Chalupa | |
| 6,034,493 A | 3/2000 | Boyd et al. | |
| 6,072,289 A | 6/2000 | Li | |
| 6,081,091 A | 6/2000 | Mitchell et al. | |
| 6,107,772 A | 8/2000 | Liu et al. | |
| 6,124,689 A | 9/2000 | Kardash | |
| 6,163,120 A | 12/2000 | Menegoli | |
| 6,531,843 B2 | 3/2003 | Iwaji et al. | |
| 6,583,593 B2 | 6/2003 | Iijima et al. | |
| 6,661,192 B2 | 12/2003 | Copeland | |
| 6,795,268 B1 | 9/2004 | Ryan | |
| 6,825,646 B2 | 11/2004 | Colombo | |
| 6,885,163 B2 | 4/2005 | Heidrich | |
| 6,979,970 B2 | 12/2005 | Iwanaga et al. | |
| 6,995,530 B2 | 2/2006 | Biamonte et al. | |
| 7,138,776 B1 | 11/2006 | Gauthier et al. | |
| 7,141,949 B2 | 11/2006 | Harwood | |
| 7,166,980 B1 | 1/2007 | LeGrand | |
| 7,180,262 B2 | 2/2007 | Consoli et al. | |
| 7,202,618 B2 | 4/2007 | Ide et al. | |
| 7,245,104 B2 | 7/2007 | Tomigashi et al. | |
| 8,030,867 B1 | 10/2011 | Allison, III | |
| 8,063,591 B2 | 11/2011 | Yamamoto | |
| 8,203,296 B2 | 6/2012 | Hristov | |
| 8,212,508 B2 | 7/2012 | Paintz et al. | |
| 8,456,117 B2 | 6/2013 | Paintz | |
| 8,461,789 B2 | 6/2013 | Paintz et al. | |
| 2001/0048278 A1 | 12/2001 | Young et al. | |
| 2004/0056627 A1 | 3/2004 | Grasso et al. | |
| 2004/0075407 A1 | 4/2004 | Ohiwa et al. | |
| 2004/0263104 A1 | 12/2004 | Iwanaga et al. | |
| 2005/0146296 A1 | 7/2005 | Klemm et al. | |
| 2010/0141192 A1 | 6/2010 | Paintz et al. | |

OTHER PUBLICATIONS

Schmidt, et al. "Initial Rotor Angle Detection of a Non-Salient Pole Permanent Magnet Synchronous Machine," IEEE Industry Society, Annual Meeting, New Orleans, Louisiana (Oct. 5-9, 1997).

* cited by examiner

ACCURACY OF ROTOR POSITION DETECTION RELATING TO THE CONTROL OF BRUSHLESS DC MOTORS

The present invention relates to improvements in and to the control of brushless DC (BLDC) motors.

BLDC motors typically comprise a magnetic rotor and one or more stator phases each comprising at least one coil winding. The rotor is driven by applying a suitable driving current waveform to one or more phases. In order to synchronise the applied current with rotor position and thus ensure efficient motor operation, one phase is left floating (undriven) so that the back EMF generated by rotor rotation can be monitored.

Often the phases are driven by a PWM (pulse width modulation) waveform, usually comprising a square wave having alternate forward (or ON) pulses and null pulses. If the phases are driven using a PWM waveform the BEMF voltage on the floating phase is disturbed by ringing oscillations caused by RLC components of the motor phase in response to the rising (or falling) edge of the PWM modulation. As such, the rotor position can be estimated les accurately and thus efficient operation is impaired.

It is therefore an object of the present invention to provide a solution that at least partially overcomes or alleviates the above problem.

In accordance with a first aspect of the present invention there is provided a method of monitoring the back EMF in a floating phase of a BLDC motor, the other phases being driven by a PWM waveform comprising a series of on pulses of a first polarity interspersed with zero signal periods, the method comprising: inserting a reverse pulse prior to a scheduled PWM on pulse, the reverse pulse having a duration of less than the subsequent PWM on pulse; and monitoring the back EMF during the final portion of the PWM on pulse.

The effect of the reverse pulse and the monitoring of the back EMF during the final part of the PWM on pulse is to reduce the effect of ringing oscillations and thus improve the accuracy of rotor position detection using Back EMF monitoring.

The reverse pulse may be a pulse of reverse polarity to the on pulse applied to the same stator phase as the on pulse or the reverse pulse may be a pulse applied to another stator phase. If the pulse is applied to another phase it is a pulse of a polarity such that it drives the motor in a direction opposite to the direction in which the motor is driven by the on pulse.

The on pulse subsequent to a reverse pulse may be of extended duration. Preferably the on pulse may be extended by a period equal to the duration of the reverse polarity pulse. This can maintain an effective PWM current equivalent to the desired PWM duty cycle value despite the extended on period. Preferably, back EMF monitoring is carried out during the extended portion of an extended duration on pulse. This can be achieved by use of a delay circuit or counter initiated at the same time as the on pulse to control the monitoring.

The method may be applied at all PWM duty cycles. Alternatively, the method may only be applied during selected PWM duty cycles. In particular the method may be applied at PWM duty cycles below a threshold value. The threshold may be selected by consideration of the ringing settling time in the motor and in particular may be applied to PWM duty cycles where the duration of the on pulse is less than the ringing settling time. In such embodiments, the extended on pulse duration may be defined as a preset minimum duration by consideration of the ringing settling time and the requisite reverse pulse duration may be defined as the difference between the preset minimum duration and the standard on pulse duration for a given PWM duty cycle value. In addition to reducing the ringing this may minimise effects due to non-zero current derivatives during the reverse pulse and thus reduce the need for increased or improved EMC filtering.

The reverse pulse may be applied before each on pulse or may be applied only before selected on pulses. The reverse pulse may be applied intermittently, for instance before every $n^{th}$ on pulse. Alternatively, the reverse pulse may be applied before on pulses only when a zero crossing of the back EMF is expected or on opposite sides of an expected zero crossing.

Back EMF monitoring may be carried out using a comparator to detect zero crossings. Additionally or alternatively, it may be carried out using a suitable analogue to digital converter. The back EMF signal may be low pass filtered or integration filtered before monitoring.

The motor may be a three phase BLDC motor.

In accordance with a second aspect of the present invention there is provided a brushless DC motor operable in accordance with the method of the first aspect of the present invention.

The motor of the second aspect of the present invention may incorporate any or all features of the first aspect of the present invention as are desired or as are appropriate.

In order that the present invention is more clearly understood, one embodiment will now be described, by way of example only and with reference to the accompanying drawings in which.

During typical operation of a 3 phase BLDC motor, during periods of time, two of the phases are driven using a suitable driving waveform and the third phase is left floating. This allows the back EMF in the third phase to be monitored for the purpose of determining rotor position. Typically this is achieved by monitoring the back EMF signal for zero crossing or by sampling the back EMF signal using an analogue to digital converter and interpolating the sampled signal to determine a zero crossing point.

Figure 1:
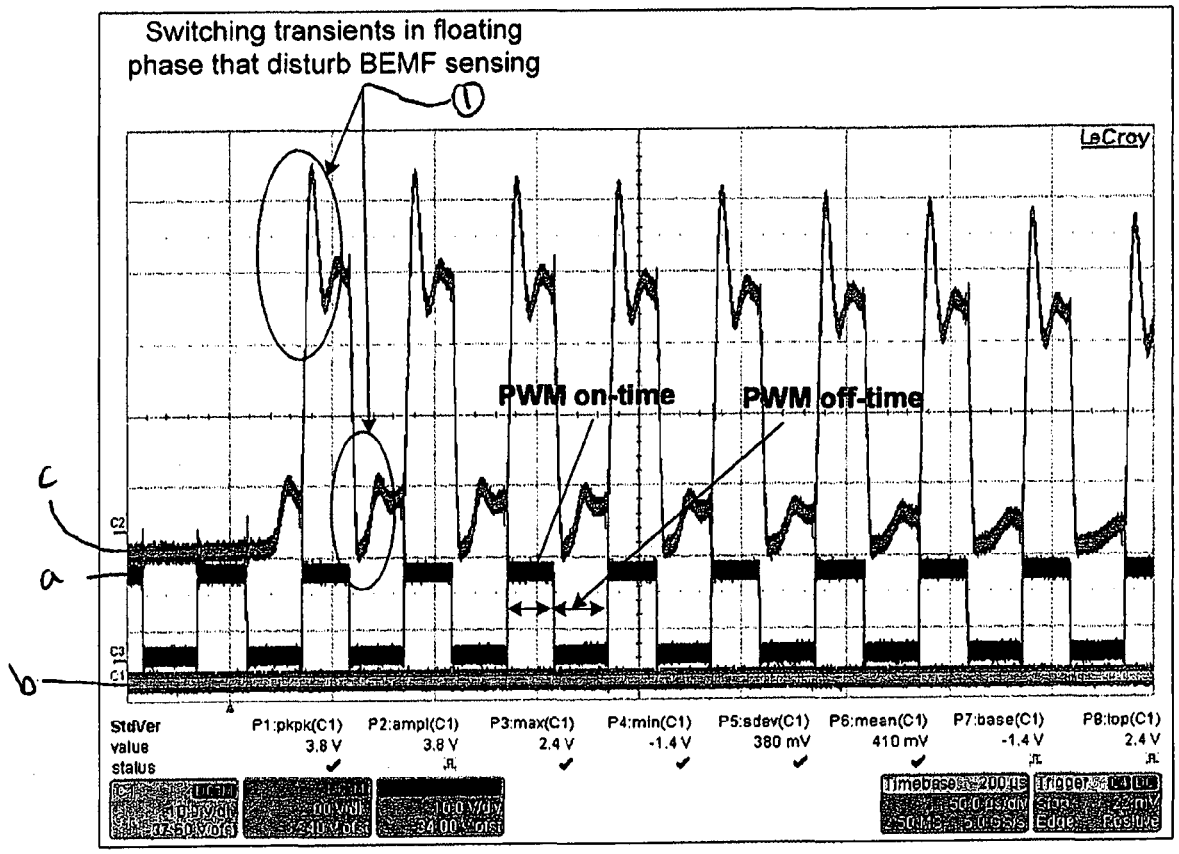
FIG. 1 illustrates the voltage signals present in three phases of a BLDC motor during conventional PWM operation.

In many instances, the motor is driven by use of a PWM waveform. To achieve this in a typical configuration, a PWM square wave voltage signal is applied to one of the driven phases and the other driven phase is connected thereto but no driving signal is applied. This results in an average current of a desired value flowing through both linked phases. This is illustrated in FIG. 1 which is a voltage time plot for each of the phases. Curve a shows the applied PWM signal alternating on pulses with intervening null periods and curve b shows the lack of signal applied to the other driving phase. Curve c is shown at an expanded vertical scale for clarity and illustrates the back EMF in the floating phase. As can clearly be seen, the rapid switching of the PWM pulses causes ringing in the back EMF signal indicated for one pulse by the ringed portions 1 of curve c. The ringing in the back EMF signal introduces inaccuracy into position calculations derived from back EMF signal measurement.

Figure 2:
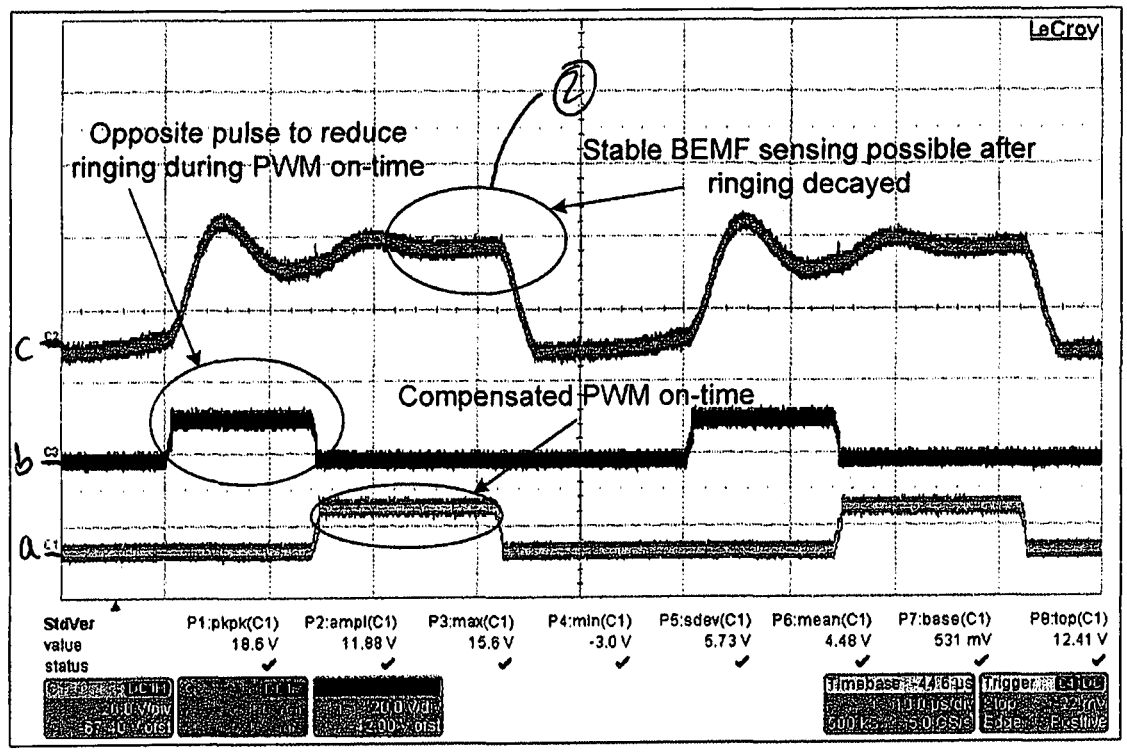
FIG. 2 illustrates the voltage signals present in three phases of a BLDC motor during PWM operation according to the present invention.

In order to reduce this ringing, in the present invention, a reverse pulse is applied prior to a PWM on pulse. This is illustrated in FIG. 2. Herein, curve a shows the applied PWM signal applied to the first driving phase. A reverse pulse is applied to the other driving coil shown on curve b. The reverse pulse has a polarity such that it drives the phase current through the linked coils in a direction opposite to that caused by the PWM on pulse. Turning now to curve c, it can be readily seen that the magnitude of the ringing in the back EMF signal is reduced.

The skilled man will appreciate that in alternative embodiments, it is possible for the reverse pulse to be a pulse of opposite polarity to the on pulse applied to the same driving coil as the on pulse.

In order to maintain a desired average current in accordance with the preset PWM duty cycle, the duration of the PWM on pulse is extended by a period equal to the duration of the reverse pulse. As a result, the ringing on the back EMF signal has decayed before the end of the PWM on pulse and thus an accurate back EMF signal value can be obtained during the latter part of the PWM on pulse, as is illustrated at 2.

Whilst in a simple implementation, the reverse pulse may be applied before every on pulse, in a more sophisticated implementation, the reverse pulse is only applied intermittently. Typically, in such implementations back EMF monitoring only takes place subsequent to application of the reverse pulse. For example, a reverse pulse may be applied either side of an expected zero crossing such that the position of the zero crossing can be interpolated by sampling the back EMF signal subsequent to both reverse pulses. In a three phase motor, this can reduce the necessity for reverse pulses to two in every 60° of rotation.

Figure 3:
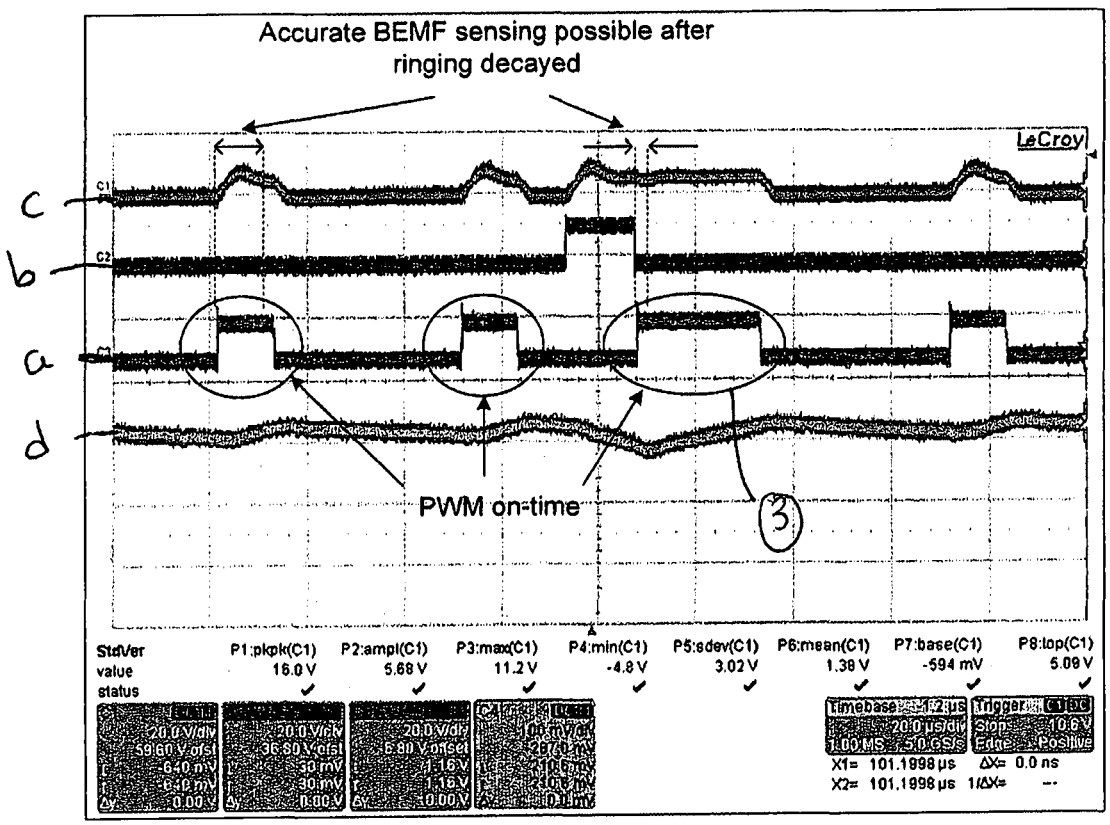
FIG. 3 illustrates the voltage signals and phase current present in three phases of a BLDC motor during operation switching between that of FIG. 1 and that of FIG. 2.

FIG. 3 illustrates the intermittent application of a reverse pulse. As before, the PWM signal applied to the first driven phase is curve a, the reverse pulse applied to the second driven phase is curve b and the back EMF signal on the floating phase is curve c. As is clearly shown, the reverse pulse is only applied before the third PWM pulse 3 on curve a. This results in an extended period of steady back EMF signal on the corresponding portion of curve c, thus enabling accurate position determination. Additionally shown on this figure is curve d illustrating the variation in the average driving current in the driven phases due to the reverse pulse and the PWM on pulses.

In other implementations, the above method may only be applied if the ringing decay time is of the order of or greater than the PWM on pulse duration. Outside such circumstances the ringing has a less significant effect on the measured back EMF signal. An example of how this determination may be carried out is set out below for a PWM switching frequency of 20 kHz (hence a PWM cycle period of 50 us) and an assumed ringing decay period of 17 us. In such circumstances a duty cycle value of 34% results in a PWM on pulse duration of 17 us.

If target_effective_PWM_duty_cycle is the PWM duty cycle value needed in order to run the motor at a desired operating point. Then the following PWM modulation is applied:
If target_effective_PWM_duty_cycle>34%;
PWM on pulse duration=target_effective_PWM_duty_cycle*50 us; and
reverse pulse duration=0
However:
If target_effective_PWM_duty_cycle<=34%;
PWM on pulse duration=17 us; and
reverse pulse duration=17 us−(target_effective_PWM_duty_cycle*50 us)

It is of course to be understood that the present invention is not to be limited to the details of the above embodiment which is described by way of example only.

The invention claimed is:

1. A method of monitoring the back EMF in a floating phase of a BLDC motor, the other phases being driven by a PWM waveform comprising a series of on pulses of a first polarity interspersed with zero signal periods, the method comprising:
applying a reverse pulse prior to a scheduled PWM on pulse to the complementary stator phase to which the on pulse is applied, the reverse pulse having a duration of less than the subsequent PWM on pulse and having a polarity so that it drives the motor in a direction opposite to the direction in which the motor is driven by the on pulse; and
monitoring the back EMF in the floating phase during the final portion of the PWM on pulse.

2. A method as claimed in claim 1 wherein the on pulse subsequent to a reverse pulse is of extended duration.

3. A method as claimed in claim 1 wherein the method is applied at all PWM duty cycles.

4. A method as claimed in claim 1 wherein the method is only applied during selected PWM duty cycles.

5. A method as claimed in claim 1 wherein the reverse pulse is applied before each on pulse.

6. A method as claimed in claim 1 wherein the reverse pulse is applied only before selected on pulses.

7. A method as claimed in claim 1 wherein back EMF monitoring is carried out using a comparator or an analogue to digital converter to detect zero crossings.

8. A method as claimed in claim 1 wherein the back EMF signal is low pass filtered or integration filtered before monitoring.

9. A brushless DC motor operable in accordance with the method of claim 1.

10. A method as claimed in claim 2 wherein the on pulse is extended by a period equal to the duration of the reverse polarity pulse.

11. A method as claimed in claim 2 wherein back EMF monitoring is carried out during the extended portion of an extended duration on pulse.

12. A method as claimed in claim 2 wherein the on pulse has a duration determined by the ringing settling time.

13. A method as claimed in claim 4 wherein the method is applied at PWM duty cycles where the duration of the on pulse is less than the ringing settling time.

14. A method as claimed in claim 6 wherein the reverse pulse is applied intermittently.

15. A method as claimed in claim 6 wherein the reverse pulse is applied before on pulses only when a zero crossing of the back EMF is expected or on opposite sides of an expected zero crossing.

16. A brushless DC motor as claimed in claim 9 wherein the motor is a three phase BLDC motor.

* * * * *